Patented Sept. 9, 1941

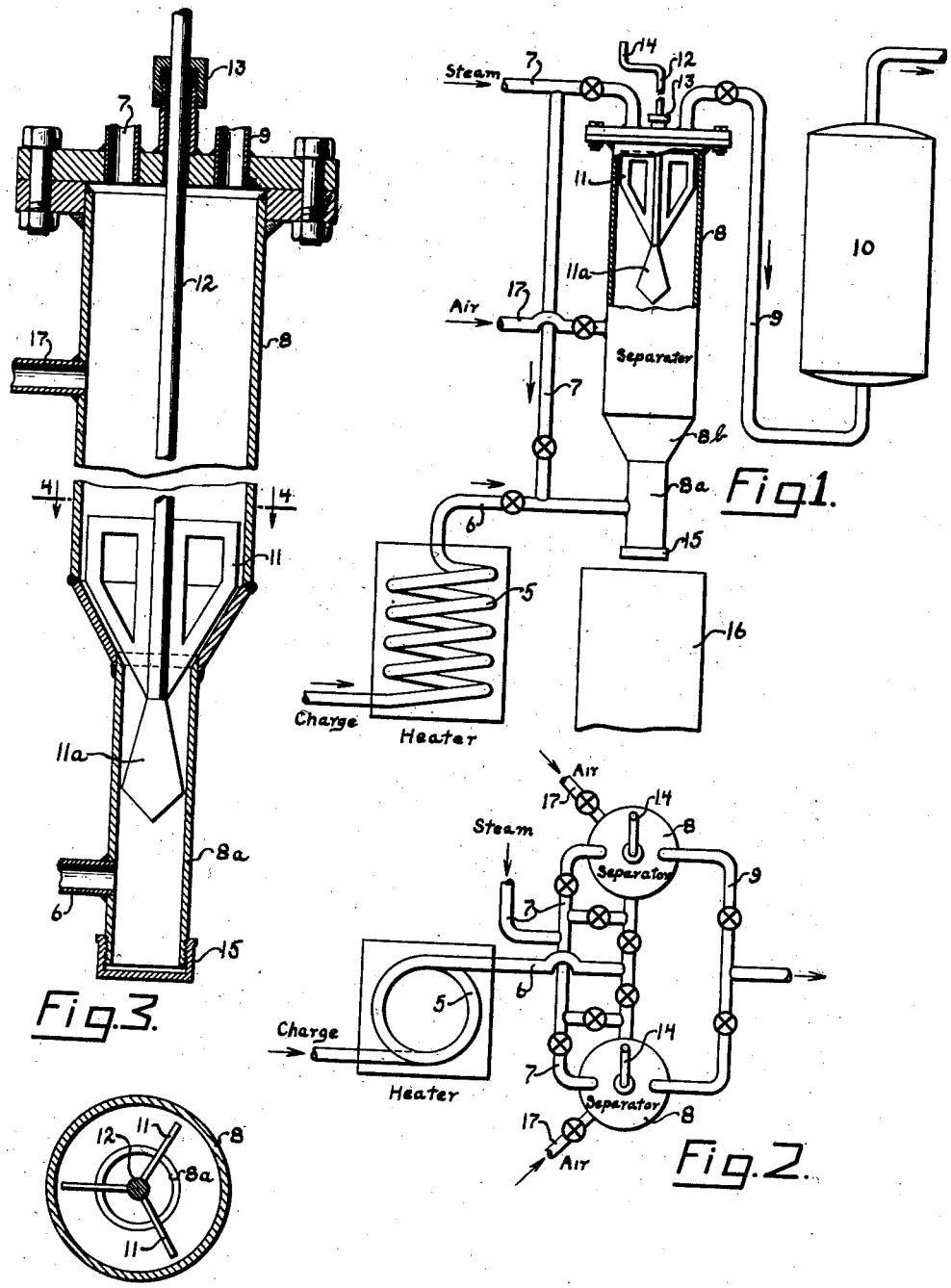

2,255,060

UNITED STATES PATENT OFFICE 2,255,060

TREATMENT OF HYDROCARBON AND OTHER RESIDUES

Eugene J. Houdry, Ardmore, Pa., assignor to Houdry Process Corporation, Wilmington, Del., a corporation of Delaware Application August 2, 1939, Serial No. 287,972

10 Claims. (Cl. 196—58)

This application is a continuation in part of my copending application Serial No. 51,770, filed November 27, 1935.

This invention relates to the processing of residues or residual material, such as those derived from petroleum, shale oil, bituminous distillates, etc. More particularly, it concerns the removal therefrom of certain components such as ash, coke, tarry and resinous material, asphalt and substances which are readily changed into coke and asphaltenes, all of which components are undesirable or highly deleterious to the conversion of such hydrocarbons into more valuable products such as motor fuels, domestic fuel oil, and other lighter hydrocarbons.

One object of the invention is to remove the objectionable components and to produce a relatively clean material desirable for storage, for transportation by pipe lines or otherwise, and as charging stock for cracking or other transforming or treating operations. Another object is to present the clean material in vapor phase for such further transforming and refining operations. Another object is to produce, in the cleaning or separating operation, a residuum in desirable soft and dry form, and to avoid the formation of a caked, sticky or other hard-to-remove deposit. Other objects will be apparent from the detailed description which follows.

The invention involves the cleaning up, as by a thermal filtering operation, of a heavy charging stock comprising or containing residual material and the removal of all components not in vapor phase in the form of a dry deposit. The charge, heated and partly in vapor phase, is fed into a separator or coking chamber at or near the lower end thereof in such a manner and at a suitable rate to keep the contents in a state of agitation and to avoid the formation of a pool of liquid. When the charge does not enter the bottom of the separator, steam or other vaporizing medium is admitted at such point to effect the agitation and quickly to cause vaporization and coking of any liquid which may tend to gather at such point. The necessary heat for the separating action is preferably supplied entirely or substantially by the incoming charge which includes the vaporizing medium. A large temperature drop within the separator is to be avoided, however, and it is usually desirable to keep the walls of the separator at uniform temperature, at or near the optimum range for the reaction. The temperature control of the walls may be effected in known manner, as by a circulated heat exchange medium in direct or indirect heat exchange with said walls. When a mixed charge of hydrocarbons and vaporizing medium is discharged upwardly through the very bottom of the separator, which is the preferred arrangement, the effect is to maintain liquids more or less in a state of suspension in the separating or expansion chamber until they drop or are thrown down or distill on the walls of the chamber to form a porous, friable mass, while the lighter parts pass out of the chamber in vapor phase. The porous mass left in the chamber is then purged of charged material, and although predominately petroleum coke it is readily dislodged by scraping equipment; in fact, the coke is at times so soft that it can be wiped away by one's finger. As the mass accumulates, it leaves a hole or passageway for the entering charge. Two or more separators are preferably used to permit continuous operation, and, from time to time, the charge is switched from one to another to permit removal of the coky deposit, which is easily effected by a simple scraping and blowing operation.

The operation on hydrocarbon charging stocks is normally conducted so as to produce as little naphtha as possible. By suitable control of operating conditions on stocks of the character hereinafter described, the naphtha production may be held to 5% or less of the charge, and, in general, the smaller the naphtha production, the smaller is the coke deposit. The separator should not be operated at a temperature below 800° F. nor above 950° F. There should not be a temperature drop of more than 150° between the inlet and outlet streams of the coker. The usual operating temperatures within the coker are in the range of about 830° to 930° F., with best operation for most stocks between 850° and 900° F. At desired operating temperatures, the quantity of liquid sent into the coking chamber may range from 10% to 50% of the combined charge of hydrocarbons and vaporizing medium. The usual stocks are crude residuals from which naphtha, kerosene and gas oil have been removed. Such stocks may contain 20% or more of material which cannot be distilled without decomposition under an absolute pressure of less than 2 millimeters of mercury. However, any material with distillation characteristics similar to those described above, whether a hydrocarbon or not, is a suitable charging stock. While the removal of the lighter portions of the charge is preferred in most cases, it is not essential and may even be inadvisable in some instances. Thermal cracking of hydrocarbons to the gasoline boiling range during the preliminary heating operation is avoided in known manner by mingling therewith a suitable amount of vaporizing medium, such as steam, inert flue gases, nitrogen, and the like, before or while passing the same through the heater coils of a conventional still. The quantity of vaporizing medium varies with the type of charging material and may range from 2 to 30% by weight. In general, the charge should be heated to such temperatures as will maintain a temperature in the separating chamber of from 800° to 950° F. and preferably between 850° and 900° F. If sufficiently heat is not supplied by the charge, heat must be supplied externally to the walls to maintain these temperatures. The total pressure on the chamber should be regulated according to the amount of steam or other diluent used to give a partial oil vapor pressure not in excess of two atmospheres and preferably less than one atmosphere. Good operations with many stocks are conducted with partial oil vapor pressures in the range of 3 to 14.7 lbs. per sq. in. absolute, in which range of pressures vacuum can be substituted for all or a part of the diluent. The size of the separator should be so regulated that the calculated time during which the vaporized portion of the hydrocarbon remains in the reaction vessel should be such as to minimize the formation of gasoline. For usual charging stocks, this time has been found to be less than 50 seconds, and, in many instances, less than 20 seconds. For certain purposes, as the production of a material containing a larger fraction of lower boiling material, it is necessary to subject the charge to more severe conditions. This is accomplished by increasing total pressure and time of contact, and decreasing the amount of diluent, within the limits specified above.

In order to illustrate the invention, one concrete embodiment thereof, which is a preferred form, is shown in the accompanying drawing, in which:

Fig. 1 is a side elevational view, somewhat diagrammatic in character, with the separator shown in vertical section;

Fig. 2 is a plan view of a part of the apparatus shown in Fig. 1;

Fig. 3 is a vertical sectional view on an enlarged scale of one of the separators; and Fig. 4 is a transverse sectional view substantially on the line 4—4 of Fig. 3.

As indicated in Figs. 1 and 2, the heavy hydrocarbon charge, preferably mixed with steam, is sent through a heater 5 of any suitable or desired type, such as a tube still, at a relatively high rate to minimize cracking and then passes, by valved line 6, where additional steam may be added, if desired, from line 7, into the lower end of one or more of a battery of separators 8. Two such separators are shown in Fig. 2, the intention being to operate continuously by sending the charge into one separator while a steaming down and cleaning operation is being performed in the other separator, the separators being arranged to alternate in function. In the preferred form shown, the entire charge enters the lower reduced end 8a of separator 8, and passes upwardly into an expansion chamber 8b, the bottom walls of which taper toward end 8a. The charge keeps the contents of chamber 8b in a continuous state of agitation, and continuously supplies heat thereto. The solids which separate out deposit upon the walls of expansion chamber 8b where they gradually build up a layer of coky material while leaving an opening or passage for the entering charge. The components in vapor phase pass out of the top of separator 8 into a valved line 9, and are in clean condition suitable for immediate thermal conversion or catalytic transformation or other treatment to produce desirable finished products of the same or different boiling range, or of entirely different composition. Such additional treating apparatus is diagrammatically indicated at 10 in Fig. 1. Each separator 8 is run for a desired length of time, which is determined by the accumulation of the deposit and its nature, and then the stream of charging material is sent into another separator while the first is being cleaned of the deposit.

The cleaning operation consists in sending suitable gaseous purging material, such as steam from line 7, into and through the separator for a sufficient period to drive out all volatile hydrocarbons which may be retained absorbed or adsorbed by the deposit. An alternative means is by vacuum purging. Thereupon a scraper 11, operated by a shaft 12, which extends through a stuffing box 13 in the top of each separator, is lowered and rotated by suitable means such as a crank 14 to break up the deposit. After removal of cap 15 or the opening of a suitable valve at this point, the loosened deposit is blown out through the restricted end 8a into a suitable receptacle 16 by a gaseous ejecting agent, such as steam, admitted at the top of the separator from branched line 7. Scraper 11 is provided with an extension 11a of any desired length, to insure the clearing of the restricted lower end 8a. Scraper 11, as indicated in Fig. 4, may comprise a plurality of blades, and, when not in use, the scraper is raised to the top of the separating chamber, as indicated in Fig. 1. To effect a complete cleaning of the separator, including the thin layer of deposit which may be left by scraper 11, an oxidizing agent such as air may be admitted by line 17 to burn out the chamber.

The thermal filtering or separating action which takes place in expansion chamber 8b involves a certain amount of viscosity breaking of the charge, and the heat for this action is supplied in whole or in part by the incoming stream of mixed steam and hydrocarbons, which preferably enters the separator in the temperature range of 850° to 930° F. To take care of heat losses through the walls of the separator, the same may be kept at a constant temperature as of the order of 850° F. by external heating means (not shown) such as an electric heating coil, conduits for fused salts or other heat exchange medium, or a jacket for flue gases. If needed or desired, a part of the charge may be burned within chamber 8b to supply heat by admitting a small amount of air through line 17. In any case, the temperature within the separator is kept above 800° F. and below 950° F.

In a typical operation, the charging material was 30% bottoms of East Texas crude oil. This charge was sent through heater 5 and delivered into the restricted bottom 8a of the separator with 20% by weight of steam at an average temperature of 890° F. The wall temperature of chamber 8 was kept at 860° F. The feed rate in liquid per hour was about three times the volume of separator 8, or 3:1. The charging stock had a gravity of 22.3, viscosity at 130° F. of 287, and a viscosity at 210° F. of 75. In an hour's run, the overhead material during the first half hour had an A. P. I. gravity of 23.9, viscosity at 130° F. of 164, and viscosity at 210° F. of 53; while, during the second half hour, the overhead had a gravity of 22.8, a viscosity at 130° F. of 218, and a viscosity at 210° of 59. The overhead was a good clean oil containing less than 2% of gasoline. The deposit left in the separator comprised 2.6% by weight of the charge. When analyzed it was found to contain .72% ash, water 5%, volatile matter 12%, and the remainder coke. The mass was dry, very porous and friable, and parts of it were so soft that it could be wiped away with one's finger.

With an expansion chamber of adequate size and proper shape it is possible to continue for a much longer period than one hour, as up to about six hours, dependent of course upon the composition of the charged material and the conditions of operation. However, under preferred conditions of operation it is advantageous, from the standpoint of mechanical removal of coke, to limit the on-stream period to less than two hours and even to as short a time as thirty two minutes, in order to retain the soft or friable character of the deposit. The feed rate per hour of the charge may vary in volume to that of the separator from about 1½:1 to about 5:1. The quantity of steam or other gaseous material fed with the charge to assist vaporization and to minimize thermal cracking in the heater or still may run from 2 to 30% by weight. When the charging stock comprises heavier hydrocarbons or a lower bottom cut than that indicated in the example of the preceding paragraph, the coky deposit will be laid down at an increased rate and the length of the run on each individual separator will be correspondingly shortened, but the soft or friable character of the deposit will be retained.

The hydrocarbon charge need not be admitted to the lowest part of the separator, if provision is made for admitting vaporizing medium at such part so as to promote the reaction and the desired characteristics of the coke deposit by continually agitating any liquid which may tend to collect and form a pool. For example, good results have been obtained when the hydrocarbon charge was admitted tangentially through the tapered wall between the expansion chamber 8b and the reduced lower end 8a, while steam was continuously admitted to 8a. The hydrocarbons must be sent in sufficiently low down so that there is no carry over of liquid by the vapors which leave through line 9. Hence it is preferable to admit hydrocarbons and vaporizing medium at the very bottom of the separator so as to keep the contents of the expansion chamber in a continuous state of agitation while imparting the heat of the entering stream thereto. Thus the components of charge not in vapor phase when they are sent into the expansion chamber are kept in movement and subjected to heat until viscosity breaking takes place, with the release of vapor phase material and the depositing of the remainder in the form of solid particles which build up a layer of coky material in the lower walls of the chamber. The purging or steam out operation following the run not only removes the volatile hydrocarbons which may be in or retained by the solid deposit but also dries out the latter so that it can be readily loosened by the scraper and blown out of the chamber. The coky deposit should be steamed and removed promptly on completion of a run, for otherwise it becomes dense and hard due to the temperature and heat storage capacity of the separator.

From the above it will be apparent that the present invention provides convenient and efficient ways and means for converting hydrocarbon bottoms into clean vapor phase material suitable as charge to other treating and converting operations. The formation both of gasoline and of coke can be kept surprisingly small. Individually, they need not exceed 20% of the fraction of the charge which cannot be volatilized at low pressures without decomposition, which corresponds, for most stocks, to an overall yield of gasoline or of coke not in excess of 5% of the actual charge. Usually the combined gasoline and coke yield is of the order of 5% by weight of the charge, being of the order of 2% for gasoline and 3% for coke. These results are outstanding when compared with conventional commercial processes for coking such charging stocks by either batch or continuous methods, both of which produce more than twice as much coke, usually of a dense hard nature difficult of removal, and of the order of 15% of low grade gasoline. Moreover the separators or coking chambers of applicant are very small as compared with those of conventional processes due to shorter time of contact, shorter on-stream periods and lower coke make.

The coke, asphalt, tar, ash and other undesirable materials in the charge are recovered in a soft, porous, brittle and hence readily removable form. Aside from its value as fuel, this final coky residuum, containing as it does most if not all of the ash content of the original crude, is important as a convenient source of recovery of certain valuable substances known to exist in a state of suspension or otherwise in mineral oils. The vanadium content of certain crudes, especially those from South America, has attracted attention; in fact, the ash from one South American crude is reputed to be 43% vanadium. Silica, tin, lead, cobalt, magnesium, iron, aluminum, titanium, sodium and gold in addition to vanadium have been found in the ashes of Mexican oils. Crudes obtained in the United States contain iron, aluminum, vanadium and nickel. Recovery of such substances is readily effected by acid leaching or other chemical treatment of the coky deposit produced by the present invention, or by burning the deposit and utilizing precipitation of the fumes to insure recovery even when the desired substances become volatile.

Apparatus aspects of the invention are claimed in my co-pending application Serial No. 252,288 filed January 23, 1939 as a division of the aforesaid co-pending application Serial No. 51,770 filed November 27, 1935.

I claim as my invention:

1. In the production of clean distillate stock from liquid or liquefiable heavy hydrocarbons, the steps of heating the hydrocarbon charge to a temperature of at least 800° F. to provide a mixture of vaporized and unvaporized material, feeding the mixture of vaporized and unvaporized material to an enlarged coking zone, utilizing a vaporizing medium to minimize formation of material in the gasoline boiling range and to supply heat to the coking zone, agitating the liquid material in the zone by feeding at least a portion of the fluids entering the zone to the lowest part thereof, maintaining all parts of said zone above 800° F. in order to effect rapid decomposition of the liquid material into vaporized material and coke, and controlling the rate of feed to the coking zone so that vaporized material remains in the zone less than 50 seconds in order to hold production of material in the gasoline boiling range to not in excess of 5 percent by weight of the hydrocarbon charge.

2. In the production of clean distillate stock from liquid or liquefiable heavy hydrocarbons, the steps of heating the charge to a temperature of at least 850° F. to provide a mixture of vaporized material and unvaporized liquid material and under conditions to prevent substantial cracking of the mixture into lower boiling hydrocarbons of the gasoline type, feeding the mixture of vaporized material and liquid material to an enlarged coking zone in a manner to effect passage upwardly therein, maintaining all parts of said zone above 830° F. while the mixture is being supplied thereto in order to effect within the zone rapid decomposition of the liquid material into vaporized material and coke, and controlling the feed rate of the mixture to the coking zone to effect movement of vaporized material out of the zone in less than 50 seconds in order to hold production of material in the gasoline boiling range to not in excess of 5 percent by weight of the hydrocarbon charge.

3. In the production of clean distillate stock from liquid or liquefiable heavy hydrocarbons, the steps of heating the charge to a temperature of at least 850° F. to provide a mixture of vaporized material and unvaporized liquid material and under conditions to prevent any substantial cracking of the mixture into lower boiling hydrocarbons of the gasoline type, feeding the mixture to an enlarged coking zone for passage upwardly therein, maintaining all parts of said zone above 830° F. while the mixture is being supplied thereto in order to effect within the zone rapid decomposition of the liquid material into vaporized material and coke, maintaining a feed rate to the zone within the range of 1½ to 5 volumes hydrocarbons measured as liquid per hour per volume of coking zone in order to hold production of material in the gasoline boiling range to not in excess of 5 percent by weight of the hydrocarbon charge, and withdrawing the vaporized hydrocarbons and the coke from the zone as products of the process.

4. In the production of clean distillate stock from liquid or liquefiable heavy hydrocarbons, the steps of heating the charge to a temperature of at least 850° F. to provide a mixture of vaporized material and unvaporized liquid material and under conditions to prevent any substantial cracking of the mixture into lower boiling hydrocarbons of the gasoline type, feeding the mixture of vaporized material and liquid material to an enlarged coking zone for passage upwardly therein in order to maintain the liquid material in agitation, maintaining all parts of said zone above 830° F. while the mixture is being supplied thereto in order to effect rapid decomposition within the zone of the liquid material into vaporized material and coke, controlling the rate of feeding the mixture to the coking zone so that vaporized material is removed from the zone in less than 50 seconds in order to hold production of material in the gasoline boiling range to less than 5 per cent by weight of the hydrocarbon charge, cutting off the flow of the heated charge to the coking zone after a period not exceeding two hours and then removing coke from the zone.

5. In the production of clean distillate stock from liquid or liquefiable heavy hydrocarbons, the process steps of heating the hydrocarbons mixed with a sufficient quantity of vaporizing medium such as steam to prevent any substantial cracking of the hydrocarbons to lighter hydrocarbons of the gasoline type to a temperature above 800° F., feeding the charge of mingled hydrocarbons and vaporizing medium in a continuous stream into an enlarged coking zone, controlling the quantity of unvaporized hydrocarbons which enter said zone in atomized condition and the operating conditions including feed rate and vapor contact time of less than 50 seconds so as to hold the production of gasoline to not in excess of 5% of the hydrocarbon charge, admitting the charge in a manner to minimize formation of a pool of liquid hydrocarbons in any part of said zone, stopping the run after the accumulation of a coke deposit in said zone which in no instance exceeds 5% by weight of the hydrocarbon charge, purging said zone with vaporizing medium, and then promptly freeing said zone of the coky deposit while the latter is in soft or friable condition.

6. In the production of clean distillate stock valuable for cracking operations from liquid and liquefiable heavy hydrocarbons, the steps of heating the charge, while controlling the time of heating to prevent any substantial cracking thereof into lower boiling hydrocarbons of the gasoline type, to a temperature sufficient to place the greater portion in vapor phase and to suspend the unvaporized heavier components in the vapor in atomized condition, passing such unheated fluid charge in a continuous stream directly into the lower end of an enlarged coking zone so that the heated charge passes upwardly through said zone while minimizing gasoline formation, limiting the amount of oil charge so as to effect adequate agitation of the same within said zone and to maintain the heavier liquid components in a state of suspension while in motion therein to effect rapid decomposition thereof into vaporous components and coke and to eliminate the formation of a pool of liquid in the zone, continuously withdrawing the vaporous components from the zone at such rate as to minimize formation of material in the gasoline boiling range and to avoid excessive temperature drop between the inlet and outlet of the zone, and removing the coke from the zone at desired intervals.

7. The process as described in claim 6 further characterized by heating the liquid charge to a temperature within the range of 830° to 930° F. and sending it directly into said coking zone, cutting off the flow of charge to the zone and removing the coke from the zone while in a porous friable condition.

8. The process as described in claim 6 further characterized by heating the liquid charge and then adding an inert fluid to the heated charge so that the latter enters the coking zone in the temperature range of 850° to 930° F.

9. In a continuous process for the production of clean distillate stock valuable for cracking operations from liquid and liquefiable heavy hydrocarbons, the steps of heating the charge, while controlling the time of heating to prevent any substantial cracking thereof into lower boiling hydrocarbons of the gasoline type, to a temperature sufficient to place the greater portion in vapor phase and to suspend the unvaporized heavier components in the vapor in atomized condition, passing such heated fluid charge in a continuous stream directly into the lower end of an enlarged coking zone so that the heated charge passes upwardly through said zone while minimizing gasoline formation, limiting the amount of oil charge so as to effect adequate agitation of the same within said zone and to maintain the heavier liquid components in a state of suspension while in motion therein to effect rapid decomposition thereof and to eliminate the formation of a pool of liquid in the zone, cutting off the flow of the heated fluid charge to the coking zone while the coke deposit is in the form of a thin layer, feeding the heated charge to another coking zone under similar conditions of feeding as to the first mentioned zone, and extracting the coke deposited in said first mentioned zone while the coke remains in a porous friable condition and returning the heated charge to the first zone when the coke deposit in the second zone is in the form of a thin layer.

10. In a continuous process for the production of coke particles and a vaporous charge of hydrocarbons suitable for a conversion operation from a charge of heavy liquid oil hydrocarbons, the steps of heating the liquid charge to a temperature sufficient to place the greater portion thereof in vapor phase and the unvaporized heavier components suspended in the vapor in atomized condition while conducting said heating of the charge in the presence of an inert fluid in order to prevent any substantial cracking thereof, passing the heated fluid charge in a continuous stream directly into the lower end of an enlarged coking zone so that the heated products pass upwardly through said zone, limiting the amount of oil charge and agitating the same within said zone to maintain the heavier liquid components in a state of suspension while in motion therein in order to eliminate the formation of a pool of liquid in the zone and until decomposition is effected into vaporous components and coke, cutting off the flow of the heated fluid charge to the coking zone when the coke deposit reduces agitation within the zone in order to maintain the deposited coke in a porous friable condition, feeding the heated charge to another coking zone under similar conditions of feeding as to the first mentioned zone, immediately extracting the coke deposited in said first mentioned zone while the coke deposit remains in a porous friable condition and returning the heated charge to the first zone when the coke deposit of the second zone tends to prevent free flow of the charge thereto.

EUGENE J. HOUDRY.

CERTIFICATE OF CORRECTION.

Patent No. 2,255,060.   September 9, 1941.

EUGENE J. HOUDRY.

It is hereby certified that error appears in the printed specification of the above numbered patent requiring correction as follows: Page 2, first column, line 12, for the word "sufficiently" read --sufficient--; page 4, second column, line 30-31, claim 6, for "unheated" read --heated--; and that the said Letters Patent should be read with this correction therein that the same may conform to the record of the case in the Patent Office.

Signed and sealed this 14th day of October, A. D. 1941.

(Seal)

Henry Van Arsdale,
Acting Commissioner of Patents.